Oct. 17, 1933.    O. E. FISHBURN    1,930,711
CLUTCH MECHANISM
Filed Dec. 6, 1930    2 Sheets-Sheet 1

INVENTOR.
Otto E. Fishburn,
BY
Hood & Hahn.
ATTORNEYS

Oct. 17, 1933.  O. E. FISHBURN  1,930,711
CLUTCH MECHANISM
Filed Dec. 6, 1930  2 Sheets-Sheet 2

INVENTOR.
Otto E. Fishburn,
BY
Hood + Hahn.
ATTORNEYS

Patented Oct. 17, 1933

1,930,711

UNITED STATES PATENT OFFICE 1,930,711

CLUTCH MECHANISM

Otto E. Fishburn, Muncie, Ind., assignor, by mesne assignments, to Free Wheeling Patents Corporation, South Bend, Ind., a corporation of Delaware Application December 6, 1930. Serial No. 500,446

3 Claims. (Cl. 192—71)

My invention relates to improvements in clutches and particularly to that type of clutch known as a roller clutch. My invention has for one of its objects the provision of a roller clutch which may be readily engaged and disengaged.

More specifically, my invention relates to improvements in roller clutches and particularly the control thereof, for application to automobile transmissions and particularly has for one of its objects the provision of roller clutching mechanism, and means for operating the same, for establishing driving connection between the driven and driving shafts of an automobile, through the medium of a transmission mechanism.

For the purpose of disclosing my invention I have illustrated certain embodiments thereof in the accompanying drawings, in which.

Figure 1:
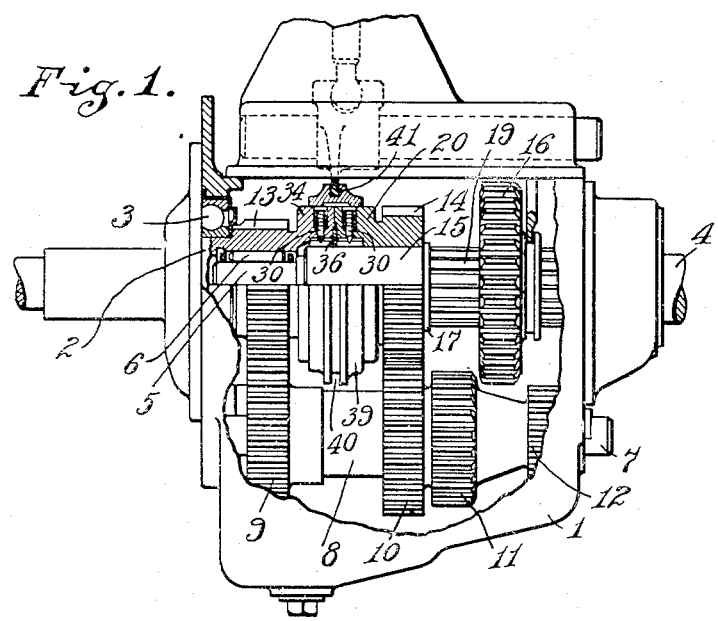
Fig. 1 is a longitudinal sectional view of an automobile transmission embodying my invention.

In the embodiment of the invention illustrated, I provide a transmission mechanism including the usual housing 1 into which extends the driving shaft 2, suitably supported in ball bearings 3 in the wall of the casing, and the driven shaft 4, which is shown as being piloted at 5 in roller bearings 6 within the driving shaft 2.

A jack shaft 7 has rotatably mounted thereon a spindle 8 provided with gears 9, 10, 11 and 12. The gear 9 is in constant mesh with a gear 13 mounted on the driving shaft 2. The gear 10 is in constant mesh with a driving gear 14 rotatably mounted on an enlarged hub 15 of the driven shaft 4. The gear 11 is adapted to be meshed with an axially movable gear 16 splined on the driven shaft 4. This gear 16 is also adapted to mesh with an idler meshing with the gear 12 for reverse drive.

The gear 14 is held against axial displacement in one direction, on the barrel 15 by means of a ring 17 in a groove 18 on the shaft 4 and held against axial displacement by the splines 19. This gear is provided with a hub 20 which forms the outer member of a roller clutch. To this end the inner periphery of the hub 20 is provided with a pair of cammed surfaces 21 and 22 gradually diminishing in depth towards the axis of the barrel 15 in one direction, and a pair of cammed surfaces 23 and 24 gradually diminishing in depth towards the axis of the barrel 15 in an opposite direction. Interposed between each of the cammed surfaces and the barrel 15 is a series or rollers 25 gradually diminishing in diameter and biased towards the low part of the cams by means of shoes 26 and coiled springs 27. A pair of pressure blocks 28 is interposed between the two pairs of oppositely operating rollers, which blocks are provided with beveled edges 29. These blocks when spread act as stop members to prevent the movement of the rollers 25 toward the low portion of the cammed surfaces when there is relative rotation between the barrel 15 and the outer clutch member 20 and thereby prevent the movement of the rollers for clutching these parts together. When, however, the blocks are permitted to move and due to the fact that there are two sets of oppositely disposed roller clutch portions relative movement between the barrel 15 and the outer member 20 in either direction will cause one or the other pairs of sets of rollers to operate to lock the members together.

For spreading the blocks 28, I provide a pair of radially disposd pins 30 having tapered ends 31 for engagement with the bevel 29 of the blocks when the pins are forced inwardly. These pins are normally biased toward the outer positions by means of coiled springs 32, interposed between heads 33 on the pins and the bottoms of the sockets in which the springs are arranged.

The driving shaft 2 is provided with an extension 34 overhanging the barrel portion 15 and providing an outer member of a roller clutch similar in construction to the roller clutch described in connection with the gear 14, operating pins 35 correspond to the pins 30 being provided for controlling the operation of the roller clutches.

The axial movement of the gear 14 in a direction away from the ring 17 is prevented by the abutment of the portion 20 against the extension 34 and the axial displacement of the rollers 25 in the respective clutch members 20 and 34 is prevented by a ring 36 interposed between these clutch members and by shoulders 37 and 38.

For manipulating the locking pins 30 and 35 I provide an axially movable ring 39 provided with an outer peripheral groove 40 for the reception of a shifting fork 41, operated in the usual manner by the shifting lever of the transmission. This ring is provided with an inner peripheral groove or recess to provide engaging portions 42 and 43 for respectively engaging the pins 35 and 30.

Figure 2:
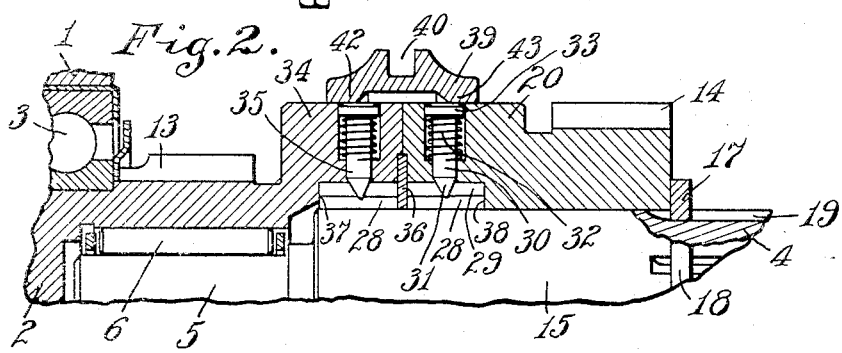
Fig. 2 is a detail section showing more particularly the operating mechanism for the clutch.

This ring straddles the extensions 20 and 34 and when in normal position the portions 42 and 43 bear on the pins 30 and 35 locking out both sets of roller clutches. The ring assumes this position when the shift lever of the transmission is in neutral. For low speed and reverse the gear 16 is shifted axially in the usual manner of the well known standard construction of sliding gear transmissions. For second speed the ring 39 is shifted to the right, looking at Figs. 1 and 2 whereby the portion 43 will move off the pins 30 while the portion 42 will remain on the pins 35. This releases the sets of roller clutches within the extension 20 so that, on relative movement between the gear 14 and the barrel 15, in either direction, the roller clutches will operate to lock these parts together whereby the gear 14 is locked to the driven shaft 4 and the driven shaft operates at second speed. If the ring 39 is shifted to the left, looking at Figs. 1 and 2, until the portion 42 moves out of engagement with the pins 35, with the portion 43 still in engagement with the pins 30 the roller clutch connecting the drive shaft 2 directly with the driven shaft 4 will be permitted to operate thereby driving the shaft 4 directly from shaft 2 and at "high" speed.

Figure 4:
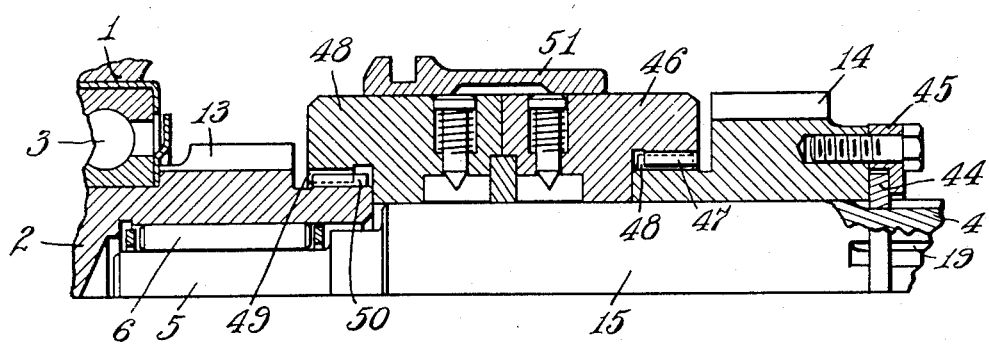
Fig. 4 is an enlarged detailed longitudinal section showing a modification of my invention.
Figure 5:
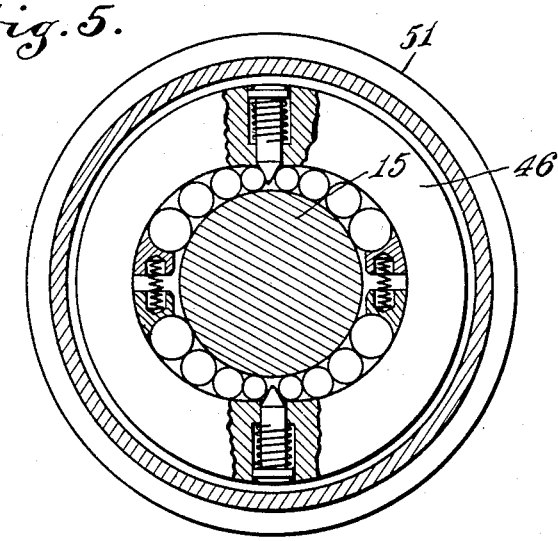
Fig. 5 is a transverse section of the clutch mechanism.

In Figs. 4 and 5 I have illustrated a slightly modified form of my invention. In this figure the gear 14 is locked against axial displacement in both directions by the locking ring 44 corresponding with the ring 17 and by means of an overhanging ring 45 secured to the end of the gear 14. The member 46 corresponds to the member 20 in Fig. 2 but is separately formed and is connected to the gear 14 by means of internal teeth 47 meshing with external teeth 48 on a hub of the gear 14.

Figure 3:
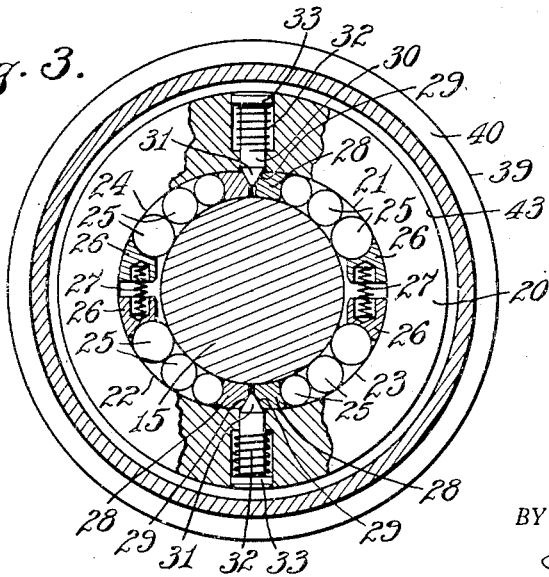
Fig. 3 is a transverse section showing in enlarged detail the roller clutch mechanism.

The member 48 corresponds to the member 34 but is separate from the driving shaft 2, being connected thereto by internal teeth 49 meshing with external teeth 50 on the driving shaft. In other respects the clutches are similar to those illustrated in Figs. 1, 2 and 3 and the operation of the parts is the same, the ring 51 corresponding to the ring 39 of Fig. 2.

I claim as my invention:

1. In a device of the character described, the combination with an outer rotary member and an inner rotary member, one of which is provided with peripheral surfaces eccentric to the axis of said members, of a series of wedging members diminishing in size interposed between said members, a radial bore through said outer member, a stop reciprocably mounted in said bore and adapted to be moved into the path of said wedging members to prevent the operation of the same and an axially shiftable member surrounding said outer rotary member and engageable with the outer end of said stop for operating the same.

2. In a device of the character described, the combination with an outer rotary member and an inner rotary member, one of which is provided with oppositely disposed peripheral surfaces eccentric to the axis of said members, of series of wedging members diminishing in size interposed between said members, a plurality of spaced radial bores through said outer member, stops reciprocably mounted in said respective bores adapted to be moved into the paths of said series to prevent the operation of the same and an axially shiftable member surrounding said outer rotary member and engageable with the outer ends of said stops for operating the same.

3. In a device of the character described, the combination with an inner rotary member and an outer rotary member, one of which is provided with peripheral surfaces eccentric to the axis of said members, of wedging members diminishing in size interposed between said members, a radially extending stop member projecting through the outer member, and an axially movable ring surrounding said outer member for manipulating said radially extending stop member.

OTTO E. FISHBURN.